Patented July 20, 1943

2,324,491

UNITED STATES PATENT OFFICE 2,324,491

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941, Serial No. 401,379

10 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter herein described, and intended to be used as the demulsifier of our process, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid, which, similarly, may conveniently be indicated as being of the dibasic type, by the formula HOOC.D.COOH, then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula:

OH($C_2H_4O$)$_m$H in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

OH($C_nH_{2n}O$)$_m$H in which $m$ has its previous significance, and $n$ represents a numeral varying from 2 to 4.

Thus, the bulk of the materials herein contemplated, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

T.OOC.D.COOH + OH($C_2H_4O$)$_m$H
                          + HOOC.D.COO.T →

T.OOC.D.COO($C_2H_4O$)$_{m-1}C_2H_4$.OOC.D.COO.T

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8-12 oxyalkylene groups, particularly 8-12 oxyethylene groups. The preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradeca-ethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic bodies employed as reactants in one mode of manufacture of the present compounds, are oxyalkylated imidazolines substituted in 2-position, by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical:

—N—(R—O)$_n$H;  —NH—(R—O)$_n$H wherein R denotes an aliphatic radical and $n$ is a whole number greater than 2 and less than 11.

The intermediate products herein contemplated for reaction with materials such as ethylene glycol dihydrogen dimaleate, are characterized by having a five-membered heterocyclic ring with two atoms different from carbon. More specifically, they may be considered as derivatives of imidazole, frequently referred to as glyoxaline. Imidazole (glyoxaline) is indicated by the following formula:

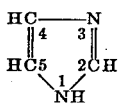

The imidazolines or glyoxalidines may be considered as dihydro-derivatives of imidazole (glyoxaline); and thus the expressions "dihydroglyoxalines" and "glyoxalidines" are often employed. The introduction of two hydrogen atoms at the 4-5 position results in the conversion of imidazole into dihydroglyoxaline, which may be indicated by the following formula:

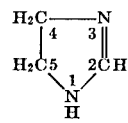

As to the manufacture of imidazolines, reference is made to the following patents: U. S. Patents Nos. 2,215,861, 2,215,862, 2,215,863 and 2,215,864, dated September 24, 1940, to Waldmann and Chwala.

Imidazolines or glyoxalidines may be regarded as dehydration products of certain amides; and they may be obtained by reacting polyamines and the higher carboxylic acids under certain conditions. The formation of these glyoxalidine compounds, while forming no part of the present invention, is indicated by the following scheme:

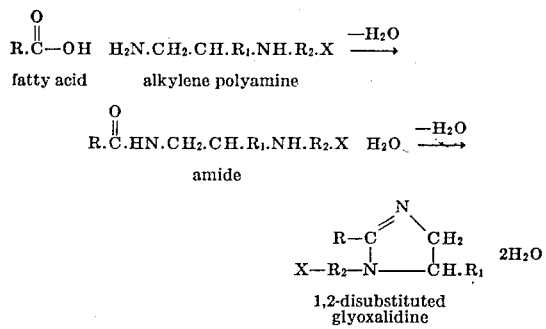

wherein R represents an alkyl or alkenyl group containing from 10 to 20 carbon atoms (the residue of a higher fatty acid); $R_1$ represents hydrogen or a lower alkyl group; $R_2$ represents an alkylene group, or a lower alkyl substituted alkylene group; and X represents a hydroxyl group, an amino group, or an amino-alkylene substituted amino group. See U. S. Patent No. 2,214,152, dated September 10, 1940, to Wilkes.

See also U. S. Patents Nos. 2,155,877 and 2,155,878, both dated April 25, 1939, to Waldmann and Chwala.

The expression "higher molecular weight carboxy acids" is an expression frequently employed to refer to certain organic acids, particularly monocarboxy acids, having more than six carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, poly ricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, tea-seed oil, partially or completely hydrogenated animal and vegetable oils, such as these mentioned; hydroxy and alpha-hydroxy higher carboxylic, aliphatic and fatty acids, such as hydroxystearic acid. dihydroxypalmitic acid, dihydroxystearic acid, dihydroxybehenic acid, alphahydroxy capric acid, alphahydroxy stearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphtho¹c, hydrogenated carboxy-diphenyl, naphthenic, and abietic acid; aralkyl and aromatic acids, such as hexahydrobenzoic acid, hydrogenated naphthoic, hydrogenated poly - carboxy - diphenyl, naphthenic, and abietic acid; aralkyl and aromatic acids, such as benzoic acid, Twitchell fatty acids, naphthoic acid, carboxy-diphenyl, pyridine carboxylic acid, hydroxy-benzoic acid, and the like.

Other suitable acids include phenylstearic acid, benzoylnonylic acid, campholic acid, fencholic acid, cetyloxybutyric acid, cetyloxyacetic acid, chlorstearic acid, etc.

Another source of suitable acids are those commonly referred to as lac acids, such, for example, as the acids derived from shellac. Such acids include various polyhydroxy acids, for example, aleuritic acid, shelloic acid, and kerrolic acids.

As is well known, one may use substituted acids in which some other non-functional constituent enters the structure of the fatty acid. For instance, one may use aryl-, hydroxy-, alkoxy-, chloro-, keto-, and amino-derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect, except in altering the hydrophile-hydrophobe balance.

One may also employ the blown or oxidized acids, such as blown ricinoleic acid, blown oleic, etc., or estolides derived from blown oils, such as blown castor oil, blown soyabean oil, etc.

Needless to say, the acids themselves need not be employed; but one may readily employ any functional equivalent, such as the anhydrides, the acyl chloride, or the like. In some instances, the esters, especially in presence of a trace of a significant amount of water, act as the acid itself, in that the acid is liberated. Unless specific reference is made to a particular isomer, one may employ any isomer or mixture of various isomers, if the acid or acids are so available. We have produced demulsifiers, for use in our process, by the following procedures:

HYDROXYLATED INTERMEDIATE

*Example 1*

1-aminoethyl-2-heptadecenyl glyoxalidine is prepared by mixing one gram mole (282 grams) of oleic acid with two gram moles (206 grams) of diethylene triamine, and heating the mixture for a period of about 16 hours under a distilling column. Water was continuously removed until a temperature of about 245° C. was reached. The quantity of water thus removed amounted to about 1.7 moles. Unreacted diethylene triamine was distilled from the reaction mixture under vacuum, and the residue then was purified by distillation at an absolute pressure of 1 mm. of mercury, at which point it boiled within a temperature range of 225° to 250° C. About 220 grams of the 1-aminoethyl-2-heptadecenyl glyoxalidine was obtained as a pale yellow liquid. The product also may be designated, by reference to the reactants used in its preparation, as oleyl diethylene triamine.

Ethylene oxide is introduced into the above base at a temperature of about 120–140° C., until the increase in weight amounts to about 2½ pound moles of ethylene oxide calculated upon one pound mole of the base.

HYDROXYLATED INTERMEDIATE

*Example 2*

The base used in the preceding example is replaced by 1-(aminoethyl ethylamino)-2-heptadecenyl glyoxalidine. This glyoxalidine was prepared by reacting 1 gram mole of oleic acid with three gram moles (438 grams) of triethylene tetramine in a vessel equipped with a distilling column. The mixture was heated for a period of about six hours, and water was continuously removed until a temperature of about 300° C. was reached. Approximately 1.9 moles of water were thus removed. The reaction mixture was then distilled under vacuum to remove excess triethylene tetramine.

HYDROXYLATED INTERMEDIATE

*Example 3*

Tetraethylenepentamine is substituted for triethylene tetramine as a reactant in the preceding example. The glyoxalidine obtained was treated as before with ethylene oxide.

HYDROXYLATED INTERMEDIATE

*Example 4*

Lauric acid is substituted as a reactant for oleic acid in the three preceding examples.

HYDROXYLATED INTERMEDIATE

*Example 5*

Ricinoleic acid is substituted for oleic acid in Examples 1-3, preceding.

HYDROXYLATED INTERMEDIATE

*Example 6*

Naphthenic acid is substituted for oleic acid in Examples 1-3, preceding.

HYDROXYLATED INTERMEDIATE

*Example 7*

An equivalent molal amount of propylene oxide is substituted for ethylene oxide in Examples 1-6, preceding.

The preferred type of demulsifier is obtained by the action of 2-10 moles of the oxyalkylating agent, for instance, ethylene oxide or propylene oxide, on one mole of the imidazoline.

In the hereto appended claims, the addition products formed by reaction with acids or the basic form by reaction with water, is included within the scope of the claims. Similarly, where the claims specify the presence of the group:

—N—(R—O)$_n$H;  —NH—(R—O)$_n$H i. e., the group introduced by oxyalkylation at the amino hydrogen position, it is understood that R includes groups derived from glycid or the like.

Specific attention is directed to the fact that one may use various oxyalkylating agents in addition to those already indicated. For instance, note the oxyalkylating agents specifically enumerated in aforementioned U. S. Patent No. 2,211,001, and also in U. S. Patent No. 2,208,581, dated July 23, 1940, to Hoeffelmann. All the oxyalkylating agents mentioned in both of the previously designated patents may be employed as reactants for the manufacture of demulsifying agents contemplated in the present process.

GLYCOL ESTER INTERMEDIATE PRODUCT

*Example 1*

One pound mole of nonaethylene glycol is treated with two pound moles of maleic anhydride, so as to form nonaethylene glycol dihydrogen dimaleate.

GLYCOL ESTER INTERMEDIATE PRODUCT

*Example 2*

A mixture of lower non-distillable polyethylene glycols, representing approximately deca- to tetradecaethylene glycol, is substituted for nonaethylene glycol in the preceding example.

GLYCOL ESTER INTERMEDIATE PRODUCT

*Example 3*

A 50-50 mixture of nonaethylene glycol and lower nondistillable polyethylene glycols of the kind described in the previous example is substituted for nonaethylene glycol in Example 1.

GLYCOL ESTER INTERMEDIATE PRODUCT

*Example 4*

Adipic acid is substituted for maleic anhydride in Examples 1-3, preceding.

GLYCOL ESTER INTERMEDIATE PRODUCT

*Example 5*

Oxalic acid is substituted for maleic anhydride in Examples 1-3, preceding.

GLYCOL ESTER INTERMEDIATE PRODUCT

*Example 6*

Citric acid is substituted for maleic anhydride in Examples 1-3, preceding.

GLYCOL ESTER INTERMEDIATE PRODUCT

*Example 7*

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

COMPOSITION OF MATTER

*Example 1*

Two pound moles of a material of the kind exemplified by Hydroxylated intermediate, Example 1, are reacted with one pound mole of a glycol ester intermediate product of the kind described under Glycol ester intermediate products, Examples 1, 2 and 3, preceding. Such reaction product is conducted until all carboxyl acidity has disappeared. The time of reaction may vary from a few hours to as many as 20 hours.

COMPOSITION OF MATTER

*Example 2*

A material of the kind described in Hydroxylated intermediate, Example 2, is substituted for a material described in Hydroxylated intermediate, Example 1, in Composition of matter, Example 1.

COMPOSITION OF MATTER

*Example 3*

A material of the kind described in Hydroxylated intermediate, Example 3, is substituted for a material described in Hydroxylated intermediate, Example 1, in Composition of matter, Example 1.

COMPOSITION OF MATTER

*Example 4*

A material of the kind described in Hydroylated intermediate, Example 4, is substituted for a material described in Hydroxylated intermediate, Example 1, in Composition of matter, Example 1.

COMPOSITION OF MATTER

*Example 5*

A material of the kind described in Hydroxylated intermediate, Example 5, is substituted for a material described in Hydroxylated intermediate, Example 1, in Composition of matter, Example 1.

COMPOSITION OF MATTER

*Example 6*

A material of the kind described in Hydroxylated intermediate, Example 6, is substituted for a material described in Hydroxylated intermediate, Example 1, in Composition of matter, Example 1.

COMPOSITION OF MATTER

*Example 7*

Glycol ester intermediate products of the kind exemplified by Examples 4-7, preceding, are substituted for Glycol ester intermediate products, Examples 1, 2 and 3, in the preceding 6 examples.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a nonvolatile inert solvent which simply acts as a diluent or viscosity reducer.

In the preceding examples, attention has been directed primarily to the monomeric form, or at least to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

acid . . . . glocol . . . . acid

If, however, one prepared an intermediate product employing the ratio of three moles of maleic anhydride and two moles of nonaethylene glycol, the tendency would be to produce a product which might be indicated in the following manner:

acid . . . . glycol . . . . acid . . . . glycol . . . . acid

Similarly, three moles of the glycol and four moles of the acid might tend to give a combination which may be indicated thus:

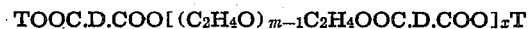

Another way of stating the matter is that the composition may be indicated in the following manner:

$TOOC.D.COO[(C_2H_4O)_{m-1}C_2H_4OOC.D.COO]_xT$ in which the characters have their previous significance and $x$ is a relatively small whole number less than 10 and probably less than 5; and in the monomeric form $x$, of course, is 1. The limitations on the size of $x$ are probably influenced, largely, by the fact that reaction leading to further growth is dependent upon random contact.

Some of the products are self-emulsifiable oils, or self-emulsifiable compounds; whereas, others give cloudy solutions or soles; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid; and (d) By using an oxyalkylating imidazoline of lower molecular weight, or having more ether linkages, or more hydroxyl groups, or more basic amino nitrogen atoms.

Indeed, in many instances the oxyalkylated amidazoline is water-soluble prior to reaction with a glycol ester. It is to be noted that in this instance one is not limited to hydroxylated materials which are water-soluble prior to reaction with a glycol ester, but they may, in fact, be perfectly water-soluble.

Actually, a reaction involving an alcohol and an acid (esterification) may permit small amounts of either one or both of the reactants, depending upon the predetermined proportion, to remain in an unreacted state. In the actual preparation of compositions of the kind herein contemplated any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

In the hereto appended claims it is intended that the monomeric forms contemplate also the polymeric forms, insofar that the polymeric forms are nothing more or less than a repetition of the monomeric forms several times over, with the loss of one or more moles of water.

Having thus described our invention, what we claim as new and desire to secure by Letters Patent is:

1. A process for breaking petroleum emulsions of the water-in-oil type, characterized by subjecting the emulsion to the action of a demulsifying agent comprising a water-soluble esterification product, derived by reaction between one mole of a polybasic compound and two moles of a substituted oxyalkylated imidazoline; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; said imidazoline being an oxyalkylated imidazoline substituted in 2-position, by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H— radicals, wherein R denotes an aliphatic radical and $n$ is a whole number greater than 2 and less than 11.

2. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a substituted oxyalkylated imidazoline; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; said imidazoline being an oxyalkylated imidazoline substituted in 2-position, by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxalkylated imidazolines containing a member of the class consisting of:

—N—(R—O)$_n$H and —NH—(R—O)$_n$H— radicals, wherein R denotes an aliphatic radical and $n$ is a whole number greater than 2 and less than 11.

3. A process for breaking petroleum emulsions of the water-in-oil type, characterized by subjecting the emulsion to the action of a demulsifying agent comprising a neutral, water-soluble esterification product, derived by reaction between one mole of a dibasic compound and two moles of a substituted oxyalkylated imidazoline; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the dibasic acid for each mole of the glycol; and said imidazoline being an oxyalkylated imidazoline substituted in 2-position, by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11.

4. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a substituted oxyalkylated imidazoline; the polybasic compound being the esterification product of (A) a polyalkylene glycol having at least 7 and not more than 17 ether linkages, and the alkylene radical thereof containing at least 2 and not more than 4 carbon atoms; and (B) a polybasic carboxy acid having not more than 6 carbon atoms; and the ratio of the esterifying reactants being within the range of more than 1 and not over 2 moles of the polybasic acid for each mole of the glycol; said imidazoline being an oxyalkylated imidazoline substituted in 2-position, by a radical containing from 11–22 carbon atoms selected from the group consisting of alicyclic hydrocarbon radicals, aliphatic hydrocarbon radicals, and aliphatic hydrocarbon radical substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11.

5. A process for breaking petroleum emulsions of the water-in-oil type, characterized by subjecting the emulsion to the action of a demulsifying agent comprising a neutral, water-soluble esterification product, derived by reaction between one mole of a dibasic compound and 2 moles of a substituted oxyalkylated imidazoline; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol; and said imidazoline being an oxyalkylated imidaozline substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11.

6. A process for breaking petroleum emulsions of the water-in-oil type, characterized by subjecting the emulsion to the action of a demulsifying agent comprising a neutral, water-soluble chemical compound of the following formula type:

TOOC.D.COO[(C$_2$H$_4$O)$_m$C$_2$H$_4$OOC.D.COO]$_x$T in which T is a radical derived by the dehydroxylation of an oxyalkylated imidazoline substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11; OOC.D.COO is the acid radical derived from a dibasic acid by removal of the acidic hydrogen atoms; said acid radical having not over 6 carbon atoms; $m$ represents a numeral varying from 7 to 12; and $x$ is a small whole number less than 10.

7. A process for breaking petroleum emulsions of the water-in-oil type, characterized by subjecting the emulsion to the action of a demulsifying agent comprising a neutral, water-soluble chemical compound of the following formula type:

TOOC.D.COO(C$_2$H$_4$O)$_m$C$_2$H$_4$OOC.D.COO.T in which T is a radical derived by the dehydroxylation of an oxyalkylated imidazoline substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11; OCO.D.COO is the acid radical derived from a dibasic acid by removal of the acidic hydrogen atoms; said acid radical having not over 6 carbon atoms; and $m$ represents a numeral varying from 7 to 12.

8. A process for breaking petroleum emulsions of the water-in-oil type, characterized by subjecting the emulsion to the action of a demulsifying agent comprising a neutral, water-soluble chemical compound of the following formula:

TOOC.D.COO(C$_2$H$_4$O)$_m$C$_2$H$_4$OOC.D.COO.T in which T is a radical derived by the dehydroxylation of an oxyalkylated imidazoline substituted in 2-position by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11; OOC.D.COO is the acid radical derived from maleic acid by removal of the acidic hydrogen atoms; and $m$ represents a numeral varying from 7 to 12.

9. A process for breaking petroleum emulsions of the water-in-oil type, characterized by subjecting the emulsion to the action of a demulsifying agent comprising a neutral, water-soluble chemical compound of the following formula type:

TOOC.D.COO(C$_2$H$_4$O)$_m$C$_2$H$_4$OOC.D.COO.T in which T is a radical derived by the dehydroxylation of an oxyalkylated imidazoline substituted in 2-position by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11; OOC.D.COO is the acid radical derived from succinic acid by removal of the acidic hydrogen atoms; and $m$ represents a numeral varying from 7 to 12.

10. A process for breaking petroleum emulsions of the water-in-oil type, characterized by subjecting the emulsion to the action of a demulsifying agent comprising a neutral, water-soluble chemical compound of the following formula type:

TOOC.D.COO(C$_2$H$_4$O)$_m$C$_2$H$_4$OOC.D.COO.T in which T is a radical derived by the dehydroxylation of an oxyalkylated imidazoline substituted in 2-position by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing a member of the class consisting of:

—N—(R—O)$_n$H and —NH—(R—O)$_n$H radicals, wherein R denotes an aliphatic radical and $n$ is a whole number greater than 2 and less than 11; OOC.D.COO is the acid radical derived from adipic acid by removal of the acidic hydrogen atoms; and $m$ represents a numeral varying from 7 to 12.

MELVIN DE GROOTE.
BERNHARD KEISER.